Figure 5:
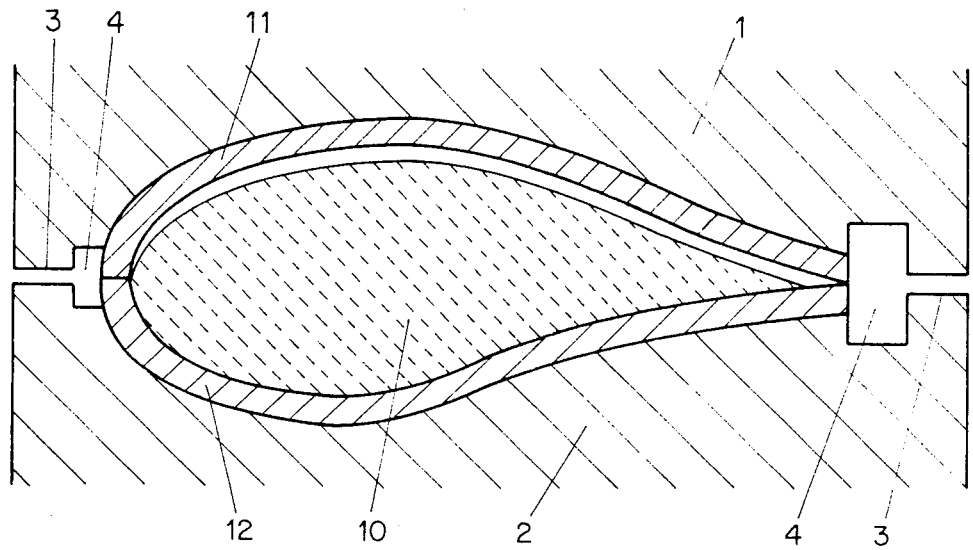

United States Patent [19]

Jahnke et al.

[11] Patent Number: 4,750,946
[45] Date of Patent: Jun. 14, 1988

[54] METHOD FOR CONNECTING SUPERALLOY COMPONENTS

[75] Inventors: Bernd Jahnke, Neckargemünd, Fed. Rep. of Germany; Gernot Gessinger; Hans Rydstad, both of Birmenstorf; Robert Singer, Untersiggenthal, all of Switzerland

[73] Assignee: BBC Brown, Boveri & Company, Limited, Baden, Switzerland

[21] Appl. No.: 828,522

[22] Filed: Feb. 12, 1986

[30] Foreign Application Priority Data

Feb. 19, 1985 [CH] Switzerland ............... 758/85

[51] Int. Cl.$^4$ .............................................. C22F 1/10
[52] U.S. Cl. ...................... 148/11.5 N; 148/11.5 Q; 148/127
[58] Field of Search .............. 148/11.5 N, 11.5 Q, 148/127

[56] References Cited

U.S. PATENT DOCUMENTS 4,490,186 12/1984 Sines et al. ............... 148/11.5 N

Primary Examiner—Richard O. Dean
Attorney, Agent, or Firm—Oblon, Fisher, Spivak, McClelland, & Maier

[57] ABSTRACT

Components (5) in a superalloy, in particular a dispersion hardened nickel based alloy, are connected together by pressure bonding in the solid condition with the greatest possible limitation of the overall deformation of the complete components (5) by lateral restraint (7), the actual bonding zone (6) having short-term intensive dynamic plastic flow imposed on it and, taking account of the deformation temperature, the local deformation rate $\dot{\epsilon}_l$ and the local deformation $\epsilon_l$ referred to the bonding zone (6) are matched together in such a way that the driving force during the subsequent heat treatment of the complete workpiece above the recrystallization temperature is sufficient to force the formation of coarse grain under all conditions. It can then be assumed that, in general, the expression $$\log(\dot{\epsilon}_l D_{Ni}^{-1} m^2) \text{ where}$$

$$\epsilon_l = \left| \ln \frac{h_o}{h_f} \right|; \quad \dot{\epsilon}_l = \frac{d\left[ \left| \ln \frac{h_o}{h_f} \right| \right]}{dt};$$

$h_o$=height of the bonding zone (6) before connection,
$h_f$=height of the bonding zone (6) after connection,
$D_{Ni}$=the temperature dependent diffusion coefficient of Ni, is within the limits 10 and 20. The nickel based superalloys of principal interest should be connected in a maximum total bonding time of 20 s, the average value of $\dot{\epsilon}_l$ being at least 0.02 s$^{-1}$ and $\epsilon_l$ being at least 0.1.

11 Claims, 4 Drawing Sheets

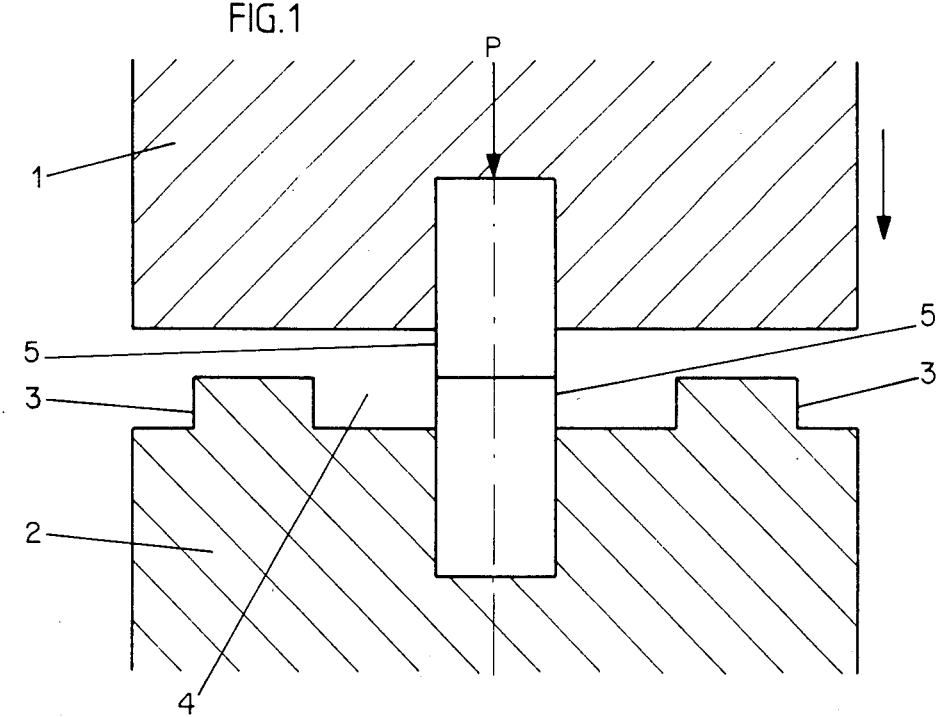
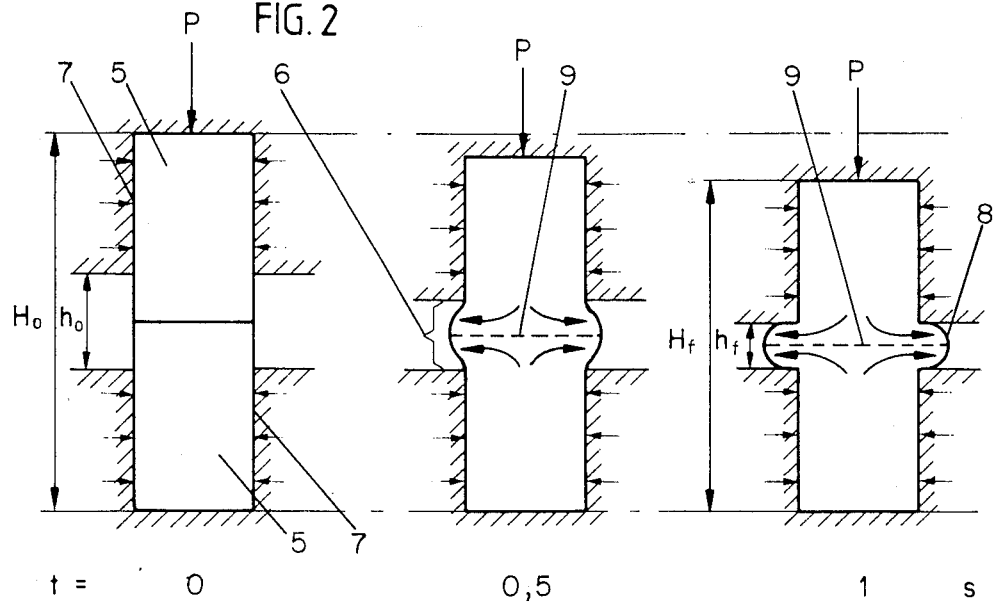

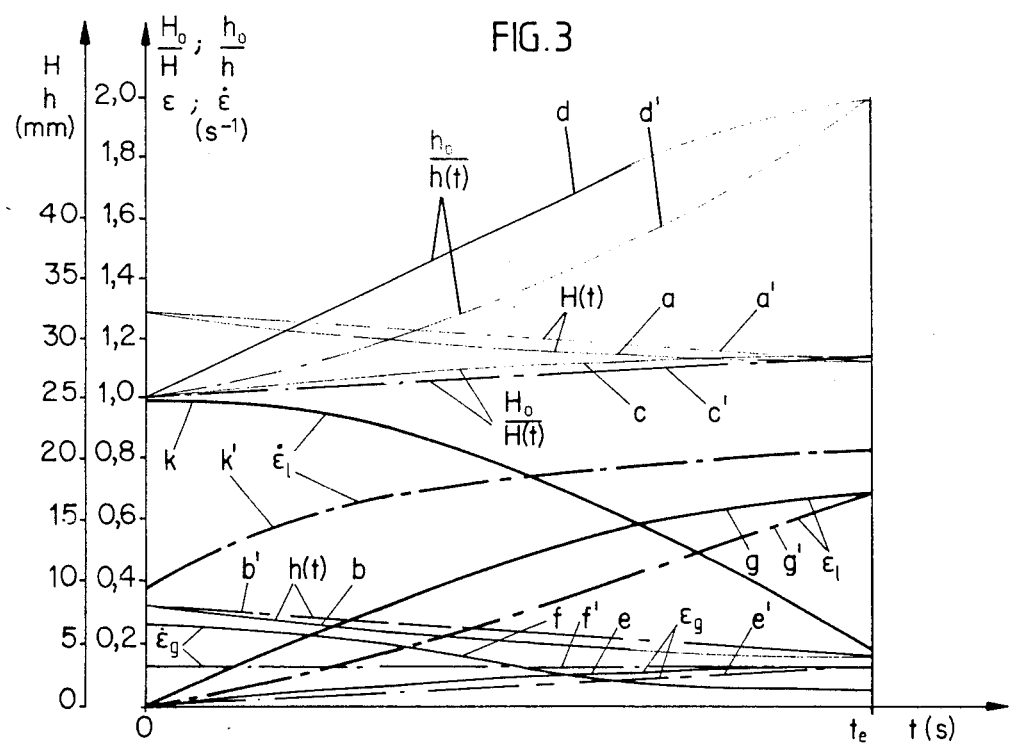
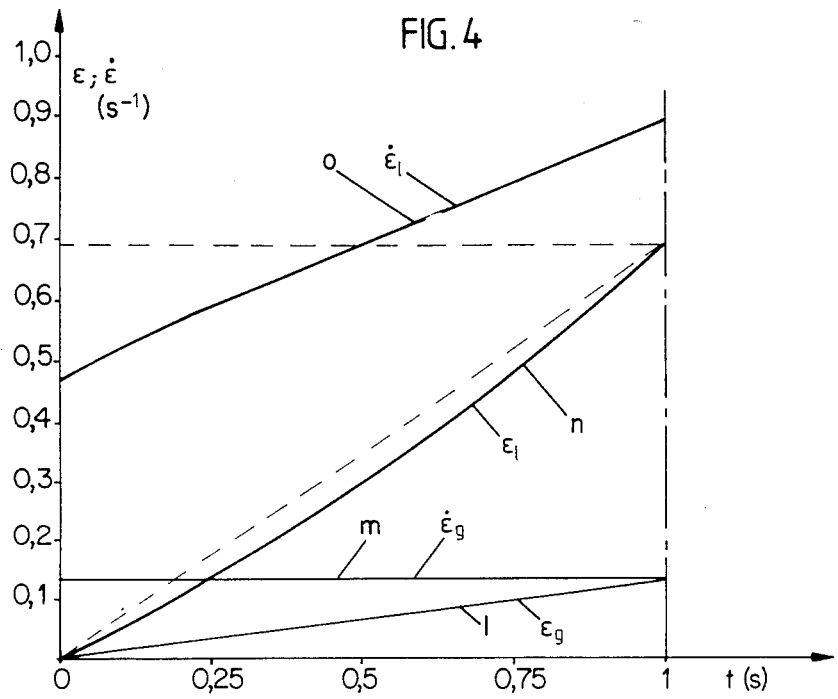

METHOD FOR CONNECTING SUPERALLOY COMPONENTS

The invention is based on a method for connecting superalloy components in accordance with the generic type of the preamble to claim 1.

The continually increasing demands made on the thermal and mechanical load carrying capability of workpieces in superalloys, particularly in the construction of highly developed thermal machines, leads to increasingly complicated and unusual shapes which, at the first attempt, can only be achieved in one piece with great difficulty or not all. Possibilities are therefore sought for producing workpieces, in several parts and having concave and hollow shapes in particular, and for connecting the several parts in a suitable manner. This raises the requirement for an end product which is, as far as possible, homogeneous, technically smooth at the joints and monolithic, in which no seams of any type can be found and whose properties are as similar as possible at all cross-sections. Particularly applicable connection methods are those methods in which there are no liquid phases, for example diffusion bonding, pressure welding, etc. Such processes are known from numerous publications—and also for materials other than superalloys (see, for example, G. H. Gessinger, Powder Metallurgy of Superalloys, Butterworths, 1984, Section 8.2.1 Diffusion bonding, pages 306–312; Holko et al, State of Technology for joining TD-NiCr sheet, Proc. Second Int. Conference on Superalloys, Processing, MCIC, Seven Springs, Pa. 1972, T-1-5-12; John A. Vaccari, Form-bonding titanium in one shot, American Machinist, October 1983, pages 91–94; G. Haufler et al, Diffusion bonding of superalloys for gas turbines, COST, Liège 1982, pages 1043–1050; K. E. Meiners, Development of gas-pressure bonding process for air-cooled turbine blades, Batelle, Columbus Ohio, NASA CR-121090, Feb. 15, 1972, pages 61–80).

A diffusion welding process for connecting components in a dispersion hardened nickel alloy is known from U.S. Pat. No. 3,798,748. In this, the surfaces to be connected are held, after previous cleaning and polishing, in intimate contact at the bonding temperature for one hour. The finished workpiece is subsequently subjected as a whole to a heat treatment process with the objective of producing a coarse grain, the recrystallization front passing over the original connection seam.

The processes described in the above publications leave something to be desired in some respects, particularly with respect to their limited reproducibility and their dependence on numerous factors such as prehistory of the material, preparation of the surfaces to be connected, economy and target accuracy of the product. The processes are, in general, complicated, slow and expensive and, in many cases, not particularly suitable for efficient industrial manufacture.

There is therefore a requirement to simplify, improve and drastically accelerate the known methods.

The object of the invention is to provide a method of connecting superalloy components, which method guarantees the manufacture of even complicated workpieces with a homogeneous structure in a shorter time, while avoiding expensive fixtures in the most efficient possible manner while retaining the greatest possible degree of simplicity. In this method, unallowably high deformations, which adversely affect the shaping procedure of the workpiece during manufacture, should be avoided as far as possible.

This object is achieved by the features given in the characterizing part of claims, 1, 2 and 5.

The invention is described by means of the following embodiment examples explained in more detail by means of figures.

Figure 6:
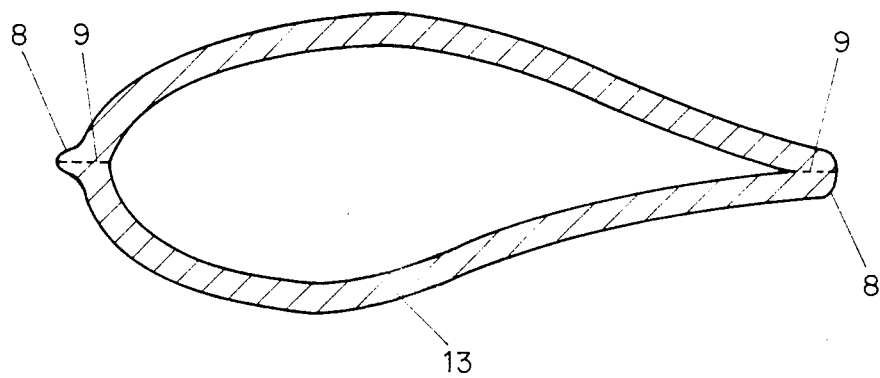
Figure 7:
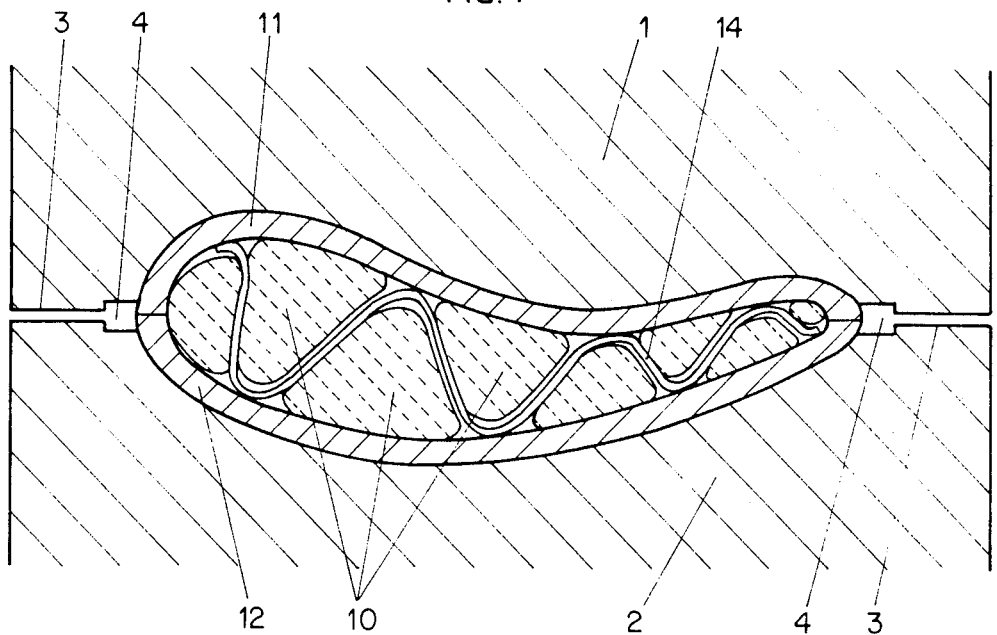
Figure 8:
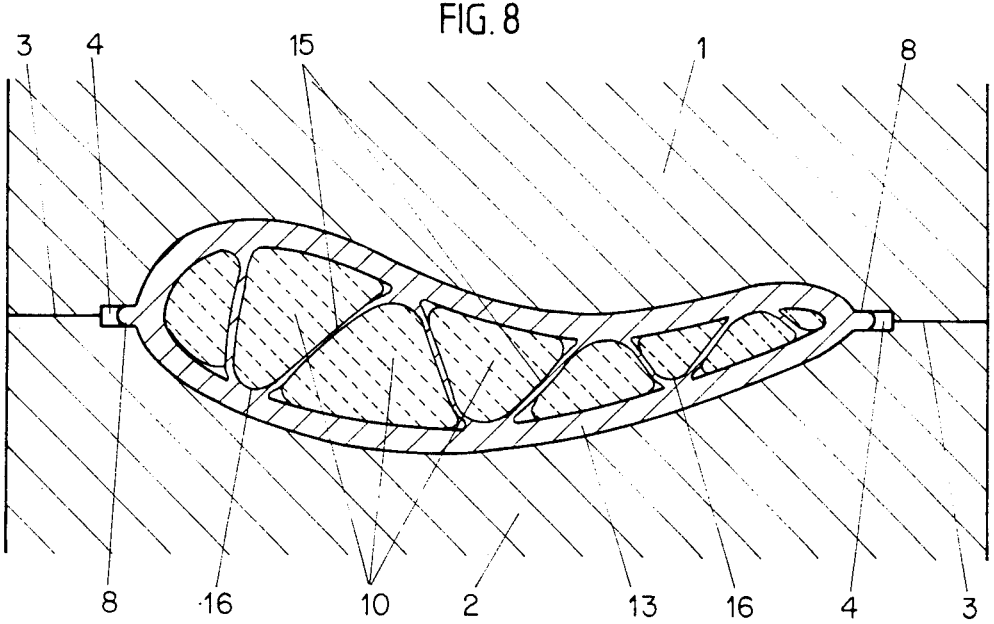

In these:

FIG. 1 shows a diagrammatic longitudinal section through a tool (press) with components to be connected inserted in it, FIG. 2 shows a diagrammatic longitudinal section through the components to be connected in the time sequence of the steps of the process, FIG. 3 shows a diagram of the essential operating parameters of the bonding as a function of time, FIG. 4 shows a diagram of the essential operating parameters of the bonding as a function of time for a constant overall deformation rate, FIG. 5 shows a diagrammatic longitudinal section through a tool with components to be connected inserted in it, before bonding, FIG. 6 shows a diagrammatic cross-section through the integrally bonded components of FIG. 5, after connection, FIG. 7 shows a diagrammatic longitudinal section through a tool with components of complicated shape inserted in it and supported before connection, FIG. 8 shows a diagrammatic longitudinal section through a tool with the integrally bonded components of complicated shape of FIG. 7, after connection.

FIG. 1 shows, diagrammatically, the longitudinal section through a tool (press) with the components to be bonded inserted in it. 1 is a die upper part and 2 a die lower part in a press equipped with a heating system for the tools (not shown). The die upper part and lower part, 1 and 2 respectively, preferably consist of a high hot strength molybdenum alloy (TZM). The die lower part 2 is provided with stops 3 for limiting the stroke of the press and recesses 4 for the flow of material. 3 and 4 can, of course, also be applied to the die upper part 1 or distributed between 1 and 2.

The components to be joined (cylindrical or prismatic test bodies in the present case) are indicated by 5. The arrow indicates the relative movement between the die upper part 1 and the die lower part 2 taking place under the action of the force P. The essential operating parameters of the bonding operation, particularly the bonding zone and the degree of deformation, are substantially fixed by the tool geometry and the dimensions of the components 5. The most important feature is the ratio of the part of the component 5 restrained in the tool to the part which can move freely.

FIG. 2 shows, diagrammatically, the longitudinal section through the components to be joined in the time sequence of the steps of the process, i.e. before, during and after the actual bonding process. In the present example, this concerns the connection of two identical cylindrical components 5, are bonded at their end surfaces. Their total height before bonding is indicated by $H_o$. The corresponding bonding zone 6 has the height $h_o$ before bonding. 7 indicates, by means of arrows, the lateral restraint. P represents the axial pressing force acting on the workpiece. The material flow caused in the bonding zone 6 is indicated by arrows directed laterally outwards. The originally contacting end surfaces of the components 5 form the virtual bonding surface 9 during the bonding process. Because of the upsetting process and the lateral material flow, a bead 8 forms in the bonding zone 6 on the workpiece. The total height of the components, 1, after bonding is indicated by $H_f$, the residual height of the bonding zone 6 by $h_f$. The time t is indicated in the present example by 0; 0.5; 1 s. The time scale can, of course, be completely arbitrary within the limitations set by the invention. The following relationships apply:

Overall deformation:

$$\epsilon_g = \left| \ln \frac{H_o}{H_f} \right|$$

Local deformation:

$$\epsilon_l = \left| \ln \frac{h_o}{h_f} \right|,$$

where
- $H_o$ = total height of the workpiece before bonding,
- $H_f$ = total height of the workpiece after bonding,
- $h_o$ = height of the bonding zone before bonding,
- $h_f$ = height of the bonding zone after bonding.

FIG. 3 is a diagram of the essential operating parameters of the bonding as a function of time. The abscissa is the time axis t in seconds (S). $t_e$ (=end of the bonding step) represents the total effective pressing time (bonding time). The heights $H=H(t)$ and $h=h(t)$ in mm, on the one hand, and the height ratios $H_o/H(t)$ and $h_o/h(t)$ together with their natural logarithms $\epsilon_g$ and $\epsilon_l$ and their derivatives with respect to time t $$\dot{\epsilon}_g = \frac{d \left| \ln \frac{H_o}{H(t)} \right|}{dt} \text{ and}$$

$$\dot{\epsilon}_l = \frac{d \left| \ln \frac{h_o}{h(t)} \right|}{dt} \text{ in } s^{-1}$$

on the other hand, are represented on the ordinate.

The significance of the individual curves a to k' is given by the following listing:

a Total height of the workpiece as a function of the pressing time t for conventional, uncontrolled presses a' Total height of the workpiece as a function of the pressing time for presses with a constant stamping speed b Height of the bonding zone as a function of the pressing time t for conventional, uncontrolled presses b' Height of the bonding zone as a function of the pressing time t for presses with a constant stamping speed c $H_o/H(t)$ as a function of the pressing time t for conventional, uncontrolled presses c' $H/H(t)$ as a function of the pressing time for presses with constant stamping speed d $h_o/h(t)$ as a function of the pressing time t for conventional, uncontrolled presses d' $h_o/h(t)$ as a function of the pressing time t for presses with constant stamping speed e $\epsilon_g$=overall deformation of the workpiece as a function of the pressing time t for conventional, uncontrolled presses e' $\epsilon_g$=overall deformation of the workpiece as a function of the pressing time t for presses with constant stamping speed f $\dot{\epsilon}_g$=overall deformation rate of the workpiece as a function of the pressing time t for conventional, uncontrolled presses f' $\dot{\epsilon}_g$=overall deformation rate of the workpiece as a function of the pressing time t for presses with constant stamping speed g $\epsilon_l$=local deformation of the bonding zone as a function of the pressing time t for conventional, uncontrolled presses g' $\epsilon_l$=local deformation of the bonding zone as a function of the pressing time t for presses with constant stamping speed k $\dot{\epsilon}_l$=local deformation rate of the bonding zone as a function of the pressing time t for conventional, uncontrolled presses k' $\dot{\epsilon}_l$=local deformation rate of the bonding zone as a function of the pressing time t for presses with constant stamping speed.

In the case of the uncontrolled presses, the deformation rate generally decreases towards the end of the press stroke because of the increase in the deformation resistance (see curve k for $\dot{\epsilon}_l$). In the case of the press controlled to provide constant stamping speed, the position is exactly reversed—the deformation rate increases during the press stroke (see curve k' for $\dot{\epsilon}_l$). The local conditions in the bonding zone 6 are critical to the metallurgical properties of the workpiece. As the diagram shows, they generally depart substantially from the overall values calculated from the geometrical data of the press.

FIG. 4 is a diagram of the essential operating parameters of the bonding as a function of time for a constant overall deformation rate. The reference signs are those defined under FIG. 3.

The significance of the individual curves l to o is provided by the following listing:

l $\epsilon_g$=overall deformation of the workpiece as a function of the pressing time t for the controlled press with a constant deformation rate $\dot{\epsilon}_g$ overall m $\dot{\epsilon}_g$=overall constant deformation rate n $\epsilon_l$=local deformation of the bonding zone as a function of the pressing time for controlled presses with a constant deformation rate $\dot{\epsilon}_g$ o $\dot{\epsilon}_l$=local deformation rate of the bonding zone as a function of the pressing time for controlled presses with a constant deformation rate $\dot{\epsilon}_g$.

In the case where the overall deformation rate is kept constant by program control (straight line m for $\dot{\epsilon}_g$)—which can be determined by calculating back from the geometrical dimensions of the workpiece and tool—there is a slight rise in the curve of the local deformation rate in the present example (curve o for $\dot{\epsilon}_l$). The average values are indicated by dotted straight lines.

FIG. 5 shows, diagrammatically, a longitudinal section through a tool with the components to be connected placed in position, but before bonding. In this case, parts of gas turbine blading, shown in profile (cross-section), are involved. 11 is a blading half-shell, upper part, whereas 12 is the associated lower part. A support body (support mass) 10 is located between them and this can, for example, consist of a ceramic material or a suitable metallic substance. The support body 10 acts to prevent unallowable deformations of the parts of the workpiece located outside the bonding zone during the bonding process. Such support bodies 10 are advantageously used where thin-walled components have to be connected. After the bonding process, they can be removed by chemical means (leaching out) or by melting them out. In the case of a metallic support body 10, its melting point must be above the bonding temperature but below the solidus temperature of the workpiece.

FIG. 6 shows, diagrammatically, a cross-section through the integrally bonded components of FIG. 5 after connection. The monolithic workpiece 13 after bonding represents gas turbine blading designed as a hollow body. 9 is the bonding surface, which can no longer be recognized, at the joint. 8 is a bead at the blading leading and trailing edges. The support body 10 (see FIG. 5) has been removed.

FIG. 7 shows, diagrammatically, a longitudinal section through a tool in which components of a complicated shape, which have to be connected, have been inserted and supported before being connected. As in FIG. 5, parts of gas turbine blading, here shown in profile (cross-section), are involved. The reference signs 1, 2, 3, 4, 10, 11, 12 correspond precisely to those of FIG. 5. The support body (support mass) 10 is in several parts in this case so that the sheet metal insert 14 can be effectively supported. The shapes of 10, 11, 12 and 14 are matched to one another in such a way that the deformation during pressing is, in the main, only possible in the sections (bonding zone) to be connected.

FIG. 8 shows, diagrammatically, a longitudinal section through a tool with the integrally bonded components of complicated shape of FIG. 7 after connection. The protrusions 15 resulting from the original sheet metal insert 14 (see FIG. 7) are solidly connected to the rest of the workpiece 13 (previously the half-shells 11 and 12) at the protrusion/half-shell bonding positions 16. The other reference signs correspond precisely to those of FIGS. 6 and 7.

EMBODIMENT EXAMPLE I

See FIGS. 1, 2 and 4

Two similar cylindrical test bodies, as the component 5, are connected on their end surfaces after the press bonding process. The components 5 have the following dimensions:

Diameter = 10 mm
Height = 16 mm ($=H_o/2$)

The material used, trade reference MA 6000 (INCO), was a dispersion hardened nickel based superalloy in the fine-grained structure condition and had the following composition:

Ni ≈ 69 Wt.-%
Cr = 15 Wt.-%
W = 4.0 Wt.-%
Mo = 2.0 Wt.-%
Al = 4.5 Wt.-%
Ti = 2.5 Wt.-%
Ta = 2.0 Wt.-%
C = 0.05 Wt.-%
B = 0.01 Wt.-%
Zr = 0.15 Wt.-%
$Y_2O_3$ = 1.1 Wt.-%

The components 5, which had been previously cleaned and ground, were brought to a bonding temperature of 980° C. and inserted in the heated tool consisting of a die upper part 1 and a die lower part 2. The tool and the workpiece were located in an argon atmosphere. Each of the cylindrical bodies was laterally restrained over a length of 12 mm whereas the other 4 mm could move freely in the recess 4.

The components 5 were axially upset and bonded under the influence of the pressing force P. The local material flow is indicated by arrows in FIG. 2. The bonding zone 6 after bonding still had a height $h_f$ of 4 mm. The operating parameters of the bonding are as follows.

The press was controlled in such a way that the overall deformation rate $\dot{\epsilon}_g$ was kept constant.

$\epsilon_g = 0.13$
$\dot{\epsilon}_g = 0.13$ s$^{-1}$ constant (curve m in FIG. 4)
$\bar{\epsilon}_l = 0.69$
$\dot{\epsilon}_l = 0.69$ s$^{-1}$ (average)
$\Delta t = 1$ s (total effective bonding time)

After bonding, the workpiece was cooled and then subjected to heat treatment. This consisted of annealing to coarse grain for 1 h at a temperature of 1200° C. The workpiece was then cooled in air. It was found that the recrystallization front had moved across the original bonding surface 9 and that the latter could no longer be recognized. Test pieces were machined out of the finished workpiece and the mechanical strength values investigated at room temperature and at an increased temperature. Neither the hot yield strength nor the fatigue strength were inferior to the corrresponding unbonded material with a comparable grain structure. 100% joint effectiveness was achieved.

EMBODIMENT EXAMPLE II

See FIGS. 1, 2 and 3

Two similar cylindrical test bodies, as components 5, were bonded on their end surfaces in a similar manner to Example I. The components had the following dimensions:

Diameter = 17 mm
Height = 14 mm ($=H_o/2$)

The material was a dispersion hardened nickel-based superalloy, trade designation MA 754 (INCO), and had the following composition:

Ni ≈ 78 Wt.-%
Cr = 20 Wt.-%
C = 0.05 Wt.-%
Al = 0.3 Wt.-%
Ti = 0.5 Wt.-%
Fe = 1.0 Wt.-%
$Y_2O_3$ = 1.0 Wt.-%

The components 5, with clean surfaces, were brought to a bonding temperature of 850° C. and inserted in the heated tools. The work was carried out under a protective atmosphere (argon). The height $h_o$ of the bonding zone 6 before bonding was 7.6 mm. The height $h_f$ of the bonding zone 6 after bonding had taken place was 3.6 mm. The operating parameters of the bonding were as follows:

The press was controlled in such a way that the stamping speed was approximately constant.

$\epsilon_g = 0.15$
$\dot{\epsilon}_g \approx 0.3$ s$^{-1}$ approximately constant (curve f' in FIG. 3)
$\epsilon_l = 0.74$
$\bar{\dot{\epsilon}}_l = 1.48$ s$^{-1}$ (average)
$\Delta t = 0.5$ s (total effective bonding time)

After bonding and cooling, the workpiece was subjected to coarse grain annealing for 1 h at a temperature of 1315° C. and a final cooling in air. The mechanical testing gave 100% joint effectiveness.

EMBODIMENT EXAMPLE III

See FIGS. 5 and 6

Parts of hollow turbine blading were used as the components. The blading half-shells (upper part 11, lower part 12) had the following cross-sectional dimensions at blading mid-height:

|  | Upper part | Lower part |
| --- | --- | --- |
| Span: | 100 mm | 100 mm |
| Max. chord (measured externally): | 21 mm | 20 mm |
| Wall thickness: | 4 mm | 4 mm |

A support body 10 of a ceramic substance, whose contours corresponded exactly to the hollow shape of the finished blading, was inserted in the half-shells. The gap available for press bonding between the semi-shells 11 and the support body 10 was approximately 2 mm—measured on one side.

The material of the blading half-shells 10 and 11 was the superalloy MA 6000 quoted in Example I.

The half-shells 11 and 12 with the included support body 10 were brought to a temperature of 950° C. under an argon atmosphere and inserted in the tool (1, 2) as shown in FIG. 5.

The operating parameters were as follows (see FIG. 2):

$H_o = 41$ mm
$H_f = 39$ mm
$h_o = 8$ mm
$h_f = 6$ mm
$\epsilon_g = 0.05$
$\dot{\epsilon}_g = 0.005$ s$^{-1}$ constant
$\epsilon_l = 0.285$
$\dot{\epsilon}_l = 0.0285$ s$^{-1}$ (average)
$\Delta t = 10$ s After bonding, the workpiece had the shape shown in FIG. 6 with the characteristic beads 8. After cooling and after the support body 10 had been chemically leached out, a heat treatment was carried out for the purpose of producing a coarse grain by means of zone annealing. The metallographic investigation showed that the original bonding surface 9 could no longer be determined from the grain structure. The crystallite had, on the average, a width of 2 mm at a thickness of 1.5 mm and a length of 10 mm. The strength figures of the unbonded material with the same grain structure were achieved throughout.

EMBODIMENT EXAMPLE IV

See FIGS. 7 and 8

The components to be bonded were parts of hollow turbine blading having several ducts and stiffening ribs on the inside. The blading half-shells (upper part 11, lower part 12) had the following cross-sectional dimensions at blading mid-height:

|  | Upper part | Lower part |
| --- | --- | --- |
| Span: | 60 mm | 60 mm |
| Max. chord (measured externally): | 10 mm | 12 mm |
| Wall thickness: | 2.4 mm | 2.4 mm |

The sheet metal insert 14 acting as stiffening was corrugated and had a wall thickness of 0.8 mm. A ceramic support mass 10 was inserted between the half-shells and the sheet metal insert 14; the contours of the ceramic support mass 10 corresponded to the duct shapes of the finished blading. The gap available for bonding between the half-shells 11 and 12 and the sheet metal insert 14, on the one hand, and the support mass 10, on the other, was approximately 0.9 mm—measured on one side.

The superalloy MA 754 specified in Example II was selected as the material for the blading half-shells 11 and 12 and the sheel metal insert 14.

The complete package consisting of the half-shells 11 and 12, the sheet metal insert 14 and the support mass 10 was brought to a temperature of 870° C. under an argon atmosphere and inserted in the tool (1, 2) as shown in FIG. 7.

The operating parameters for the pressure bonding were as follows (see FIG. 2):

The press was controlled to approximately constant stamping speed.

$H_o = 20$ mm
$H_f = 19.1$ mm
$h_o = 2.5$ mm
$h_f = 1.6$ mm
$\epsilon_g = 0.05$
$\dot{\epsilon}_g\ 0.02$ s$^{-1}$, approximately constant
$\epsilon_l = 0.445$
$\dot{\epsilon}_l = 0.178$ s$^{-1}$ (average)
$\Delta t = 2.5$ s The shape of the workpiece after bonding is as shown in FIG. 8. In addition to the leading and trailing edge of the blading, characterized by beads 8, the blading had the protrusion/half-shell bonding points 16 and the stiffening protrusions 15. The ceramic material of the support mass 10 was now leached out using chemical agents and the workpiece subjected to a heat treatment for the purpose of producing a coarse grain by isothermal annealing in a manner similar to Example III. The mechanical testing showed 100% joint effectiveness.

EMBODIMENT EXAMPLE V

See FIGS. 1 and 2

Cylindrical test bodies, as component 5, were manufactured from a superalloy with the commercial designation "Waspaloy". The components had the following dimensions:

Diameter = 10 mm
Height = 16 mm (= $H_o/2$)

The material had the following composition:

C = 0.03 Wt.-%
Cr = 19.5 Wt.-%
Mo = 4.5 Wt.-%
Co = 14.0 Wt.-%
Ti = 3.0 Wt.-%
Al = 1.4 Wt.-%
Fe = 2.0 Wt.-%
Ni = Rest The end surfaces of the components 5 were initially ground using a grinding wheel containing BN particles, cleaned in an ultrasonic bath (water plus alcohol), degreased and stored in Freon. Acetone can also be used instead of Freon. Before the test, the components were warmed under slight pressure, inserted in the tool and the whole flushed with argon. The cylindrical bodies of each component 5 were each restrained laterally for a length of 10 mm whereas the residual protruding 6 mm could move freely in the recess 4. The components 5 were each upset by 4 mm under the influence of the axially effective pressure force P and simultaneously bonded on their end surfaces. The geometry was as follows:

$H_o = 32$ mm
$H_f = 24$ mm
$h_o = 12$ mm
$h_f = 4$ mm

The operating parameters of the bonding were: constant stamping speed of 0.285 mm/s:

$\epsilon_g = 0.285$
$\bar{\dot{\epsilon}}_g \approx 0.02$ s$^{-1}$ (average)
$\epsilon_l = 1.1$
$\bar{\dot{\epsilon}}_l \approx 0.05$ s$^{-1}$ (average)
$\Delta t = 14$ s (effective bonding time)
$T = 1150°$ C. (bonding temperature)

After the conclusion of the stamping stroke, the bonded test piece was retained for a further 2 minutes hold period under the pressure finally occurring; it was then taken from the tool, cooled and subjected to a further heat treatment. This consisted in a coarse grain annealing for 1 h at 1150° C. The workpiece was then cooled in air and tested.

The invention is not limited to the embodiment examples.

The surfaces of the components 5 to be bonded are first quite generally processed and cleaned mechanically, chemically or electrolytically, brought to the bonding temperature and pressed together. The pressure bonding consists of a particular local deformation while maintaining quite definite operating parameters. In this process, it should be noted that the overall deformation $\epsilon_g$ of the complete components 5 is held within the limits specified for the maintenance of the desired shape, whereas the actual bonding zone 6 is subject to short term, intensive dynamic plastic flow. In this process, the local deformation $\epsilon_l$ and the local deformation rate are matched to one another in such a way that an originally fine grained test body shaped in accordance with the dimensions of the bonding zone 6 gives a coarse grained structure after a heat treatment at the recrystallization temperature when upset under the same deformation conditions as for the bonding of the components 5. To this end, the height $h_o$ of the bonding zone (6) before bonding must be equal to the height of the upset zone before upsetting. Corresponding conditions apply to the height $h_f$ after the bonding and upsetting.

From the physical/metallurgical conditions, it follows—for the operating parameters $\epsilon_l$ and $\dot{\epsilon}_l$—that for a given deformation $\epsilon_l$, as a function of the material, the expression $\log (\dot{\epsilon} D_{Ni}^{-1} \text{ m}^2)$, where $D_{Ni}$ = temperature dependent diffusion coefficient of nickel must lie (as a function of the material) in a well defined range between the limits A and B, where B generally has the value 20 whereas A depends on the material composition and $\epsilon_l$ but should at least have the value 10.

For a material class of the composition
Ni ≈ 69 Wt.-%
Cr = 15 Wt.-%
W = 4.0 Wt.-%
Mo = 2.0 Wt.-%
Al = 4.5 Wt.-%
Ta = 2.0 Wt.-%
C = 0.05 Wt.-%
B = 0.01 Wt.-%
Zr = 0.15 Wt.-%
Y$_2$O$_3$ = 1.1 Wt.-% the quantity A should have the value 10 for deformations $\epsilon_l$ not greater than 0.6 and the value 15.0 for $\epsilon_l$ greater than 0.6.

For a material class with the composition
Ni ≈ 78 Wt.-%
Cr = 20 Wt.-%
C = 0.05 Wt.-%
Al = 0.3 Wt.-%
Ti = 0.5 Wt.-%
Fe = 1.0 Wt.-%
Y$_2$O$_3$ = 1.0 Wt.-% the quantity A should have the value 10 for deformations $\epsilon_l$ not greater than 0.6 and the value 14.5 for $\epsilon_l$ greater than 0.6.

The process is, in general, defined by minimum values of deformation and deformation rate. The average value of the local deformation rate $\bar{\dot{\epsilon}}_l$ should be at least 0.02 s$^{-1}$, the local deformation $\epsilon_l$ should be at least 0.1, the deformation time t should not be more than 20 s and the deformation temperature should be between 800° C. and 1050° C.

The overall deformation, referred to the complete component 5, should—particularly in the case of complicated workpieces—be limited by the greatest possible restraint in the tool, represented by the die upper part 1 and die lower part 2. In the case of complicated components in the form of concave or hollow thin-walled bodies, for example blading half-shells 11 and 12, a support mass or a support body 10 is advantageously employed for the purpose of limiting the overall deformation and controlling the local deformation. After bonding, the support mass 10 is removed by mechanical, physical or chemical means. In the case of metallic support masses 10, this can be done by melting it out or by leaching it out using an agent, acid or salt solution which does not attack the component 5. The latter procedure applies in a similar fashion to ceramic support masses 10.

The method can be applied in a particularly advantageous manner to components 5 in an oxide dispersion hardened nickel superalloy with 15%, 20% or 30% Cr.

The total period of an operational cycle when bonding, including setting up, heating, cooling, etc. is 10-15-20 minutes, depending on the size of the workpiece.

The advantages of pressure bonding in accordance with the invention are a substantial reduction in the period of an operational cycle, in the control of the physical/metallurgical operating parameters for achieving optimum coarse grain size, in the good reproducibility of the results and the lower tool costs, or increased endurance of the tools, corresponding to the lower bonding temperatures. In addition, the method can be applied in an advantageous manner to complicated shapes and complex material systems.

We claim:

1. In a method for bonding solid fine grain superalloy components by the simultaneous application of pressure and heat, the improvement wherein plastic flow local deformation, $\epsilon_l$, under said application of heat limited to $$\epsilon_l = \ln \left| \frac{h_o}{h_f} \right|$$

$h_o$ = height of the bonding zone before bonding = height of the upset zone of the test body before upsetting, $h_f$ = height of the bonding zone after bonding = height of the upset zone of the test body after upsetting whereby the said fine grained alloy in the vicinity of the contact zone is subsequently converted to coarse grain structure upon heat treatment at a recrystallization temperature.

2. A method according to claim 1, wherein the local deformation $\epsilon_l$ and the local deformation rate $\dot{\epsilon}_l$ are related such that $$\log (\dot{\epsilon}_l D_{Ni}^{-1} m^2)$$

is in the range between A and B, $D_{Ni}$ = the temperature dependent diffusion coefficient of nickel, m = meter B = 20 and A depends on both $\dot{\epsilon}_l$ and the material composition and has a minimum value of 10.

3. A method according to claim 2, wherein said components have a composition consisting essentially of:

Ni ≈ 69 wt%
Cr = 15 wt%
W = 4.0 wt%
Mo = 2.0 wt%
Al = 4.5 wt%
Ti = 2.5 wt%
Ta = 2.0 wt%
C = 0.05 wt%
B = 0.01 wt%
Zr = 0.15 wt%
$Y_2O_3$ = 1.1 wt%

4. A method according to claim 3, wherein A has the value of:

10 when $\epsilon_l \leq 0.6$ 15 when $\epsilon_l > 0.6$.

5. A method according to claim 2, wherein said components have a composition consisting essentially of:

Ni ≈ 78 wt%
Cr = 20 wt%
C = 0.05 wt%
Al = 0.3 wt%
Ti = 0.5 wt%
Fe = 1.0 wt%
$Y_2O_3$ = 1.0 wt%.

6. A method according to claim 5, wherein A has the value of:

10 when $\epsilon_l \leq 0.6$ 14.5 when $\epsilon_l > 0.6$.

7. A method according to claim 1, wherein the deformation temperature is between 800° C. and 1050° C., $\dot{\epsilon}_l$ is at least 0.02 s$^{-1}$, $\epsilon_l$ is at least 0.1 and the deformation time $\Delta t$ is less than 20 s., such that $$\epsilon_l = \left| \ln \frac{h_o}{h_f} \right|; \quad \dot{\epsilon}_l = \frac{d\left[ \left| \ln \frac{h_o}{h_f} \right| \right]}{dt} = \frac{d\epsilon_l}{dt}$$

8. A method according to claim 1, wherein deformation of said components is limited by mechanical restraint.

9. A method according to claim 1, wherein said component is a concave or hollow, thin walled body containing a support mass which is removed after bonding of said component.

10. A method according to claim 9, wherein said support mass is removed from said bonded components subsequent to bonding.

11. A method according to claim 1, wherein said component is an oxide dispersion hardened nickel superalloy with a chromium content betwen 10 and 35%.

* * * * *